US011297112B2

(12) United States Patent
Schmidt et al.

(10) Patent No.: US 11,297,112 B2
(45) Date of Patent: Apr. 5, 2022

(54) INTERNET PROTOCOL MULTIMEDIA SUBSYSTEM (IMS) CALL SETUP TIME BOOSTER

(71) Applicant: Deutsche Telekom AG, Bonn (DE)

(72) Inventors: Holger Schmidt, Wegberg (DE); Stefan-Peter Hoffmann, Burgbrohl (DE); Rohith Mohandas, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/293,927

(22) PCT Filed: Nov. 12, 2019

(86) PCT No.: PCT/EP2019/081045
§ 371 (c)(1),
(2) Date: May 14, 2021

(87) PCT Pub. No.: WO2020/099418
PCT Pub. Date: May 22, 2020

(65) Prior Publication Data
US 2022/0046067 A1     Feb. 10, 2022

(30) Foreign Application Priority Data
Nov. 16, 2018    (EP) ..................................... 18206765

(51) Int. Cl.
*H04L 29/06*     (2006.01)
*H04L 65/1069*   (2022.01)
(Continued)

(52) U.S. Cl.
CPC ...... *H04L 65/1069* (2013.01); *H04L 65/1006* (2013.01); *H04L 65/1016* (2013.01)

(58) Field of Classification Search
CPC ............ H04L 65/1006; H04L 65/1016; H04L 65/1069
See application file for complete search history.

(56) References Cited

U.S. PATENT DOCUMENTS 9,948,732 B2 *  4/2018  Choi ................... H04L 65/1006
10,868,758 B1 * 12/2020 Nash ................... G06F 9/45558
(Continued)

FOREIGN PATENT DOCUMENTS

WO   WO 2011146205 A1   11/2011

OTHER PUBLICATIONS

Elena Grigoreva, et al., "M2M Wake-ups over Cellular Networks: Over-the-Top SIP", AllThingsCellular '16, Oct. 3-7, 2016, pp. 37-42, Association for Computing Machinery (ACM), New York City, New York, USA.

Primary Examiner — Asad M Nawaz
Assistant Examiner — Kai Chang
(74) Attorney, Agent, or Firm — Leydig, Voit & Mayer, Ltd.

(57) ABSTRACT

A method for decreasing a Call Setup Time Key Performance Indicator (CST KPI) of an Internet Protocol (IP) multimedia call in a mobile telecommunications network includes: initiating the IP multimedia call from an originating user equipment (UE) to a terminating UE; transmitting a session initiation protocol (SIP) call initiation message from the originating UE to a terminating Proxy-Call Session Control Function (P-CSCF) through an originating Serving-Call Session Control Function (S-CSCF); and creating a wake-up message via a network element upon receiving the SIP call initiation message. The wake-up message bypasses a plurality of network application servers (ASs) to start switching a transition of the terminating UE from an idle (Continued)

state to a connected state before the SIP call initiation message reaches the terminating P-CSCF.

15 Claims, 3 Drawing Sheets

(51) Int. Cl.
*H04L 65/1016* (2022.01)
*H04L 65/10* (2022.01)

(56) References Cited

U.S. PATENT DOCUMENTS

| | | |
|---|---|---|
| 2005/0141541 A1 | 6/2005 | Cuny et al. |
| 2008/0225835 A1* | 9/2008 | Oda .................... H04L 65/1069 |
| | | 370/352 |
| 2017/0099328 A1* | 4/2017 | Patel ..................... H04L 5/0048 |
| 2021/0259044 A1* | 8/2021 | Islam ................ H04W 52/0229 |

* cited by examiner

INTERNET PROTOCOL MULTIMEDIA SUBSYSTEM (IMS) CALL SETUP TIME BOOSTER

CROSS-REFERENCE TO PRIOR APPLICATIONS

This application is a U.S. National Phase Application under 35 U.S.C. § 371 of International Application No. PCT/EP2019/081045, filed on Nov. 12, 2019, and claims benefit to European Patent Application No. EP 18206765.2, filed on Nov. 16, 2018. The International Application was published in English on May 22, 2020 as WO 2020/099418 A1 under PCT Article 21(2).

FIELD

The present invention relates to a method and a system for decreasing the Call Setup Time Key Performance Indicator (CST KPI) of an Internet Protocol (IP) multimedia call; and a computer-readable storage medium thereof.

BACKGROUND

The VoLTE (Voice over Long Term Evolution) Call Setup Time is usually measured by the time difference between sending the INVITE request by the caller and the reception of the 180 Ringing response by the caller. Some deviations to this basic definition do exist, but they are just there for taking limitations of the measurement systems into account and for avoiding any manipulations.

Some optimizations of the call setup can be done and are usually done by the operator. The call setup is especially challenging in the mobile network as it involves the radio channel and complex resource reservation and establishment procedures.

The first optimization can be performed with respect to the reservation of the so-called user plane bearer. The user plane bearer is used for transporting the audio channel between the caller and the callee. The speech signal is digitalized and encoded using a certain audio codec, usually an AMR (Adaptive Multi Rate) or EVS (Enhanced Voice Service) codec. Originally, IMS was designed in a way which ensures that the media plane bearer is available and established before the callee's device/UE (user equipment) starts ringing. This IMS feature is called "Quality of Service (QoS) Precondition" (making the availability of a QoS enabled media bearer the precondition for ringing the callee). This mechanism is embedded in the SIP call setup messages and requires some additional SIP messages to be transferred between both parties, thus decreasing the CST. This feature which is tailor-made for the characteristics of mobile networks can be omitted in case the establishment of the user plane bearer can be assumed to be quick enough and when it can be assumed that user plane resources are always available. Another optimization can be done in the way of how the media plane bearer is established within the call setup. Furthermore the network deployment can be optimized for ensuring the minimum path length for the control and user plane messages resulting in minimum transmission delays.

SUMMARY

In an exemplary embodiment, the present invention provides a method for decreasing a Call Setup Time Key Performance Indicator (CST KPI) of an Internet Protocol (IP) multimedia call in a mobile telecommunications network. The method comprises: initiating the IP multimedia call from an originating user equipment (UE) to a terminating UE; transmitting a session initiation protocol (SIP) call initiation message from the originating UE to a terminating Proxy-Call Session Control Function (P-CSCF) through an originating Serving-Call Session Control Function (S-CSCF); and creating a wake-up message via a network element upon receiving the SIP call initiation message. The wake-up message bypasses a plurality of network application servers (ASs) to start switching a transition of the terminating UE from an idle state to a connected state before the SIP call initiation message reaches the terminating P-CSCF.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
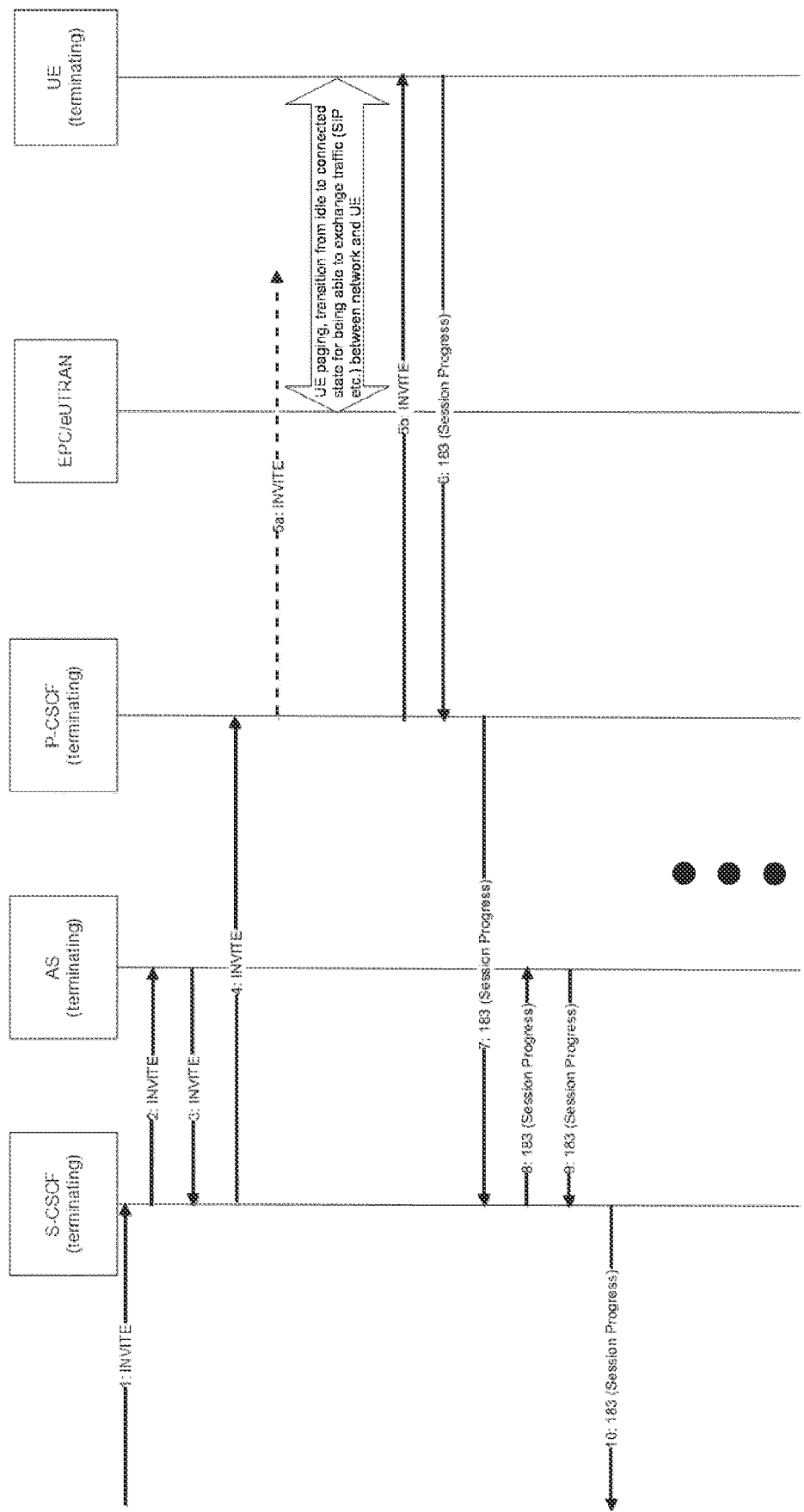
FIG. 1 illustrates general Terminating Call Procedures of the related art.

Exemplary embodiments of the present invention provide a system and a method for decreasing the CST KPI of a multimedia call. The present invention also provides a computer-readable storage medium thereof.

In accordance with an aspect of the present invention, there is provided a method for decreasing a Call Setup Time Key Performance Indicator (CST KPI) of an Internet Protocol (IP) multimedia call in a mobile telecommunications network, the method comprising: initiating the IP multimedia call from an originating user equipment (UE) to a terminating UE; transmitting a session initiation protocol (SIP) call initiation message from the originating UE to a terminating Proxy-Call Session Control Function (P-CSCF) through an originating Serving-Call Session Control Function (S-CSCF); creating a wake-up message via an element upon receiving the SIP call initiation message; wherein the wake-up message bypasses a plurality of network application servers (ASs), to start switching a transition of the terminating UE from an idle state to a connected state before the SIP call initiation message reaches the terminating P-CSCF.

The wake-up message may be an SIP OPTIONS request or e.g. an INFO or MESSAGE request.

The network element creating the wake-up request is preferably the originating S-CSCF, or a CST Improvement Application Server, or an SIP back-to-back user agent (B2BUA), or an Interconnection Border Control Function (IBCF).

The IP multimedia call may include a Voice over Long Term Evolution (VoLTE) call and/or a Video over Long Term Evolution (ViLTE) call. The IP multimedia call may further include Voice over 5G (Vo5G).

The idle state may correspond to a Radio Resource Control (RRC)/EPS (Evolved Packet System) Connection Management (ECM) RRC_IDLE/ECM_IDLE state, and the connected state may correspond to an RRC_CONNECTED/ECM_CONNECTED state of the terminating UE.

The mobile telecommunication network may be an Internet Protocol Multimedia Subsystem (IMS) network.

The wake-up message may include a special media feature tag specifying the wake-up purpose of the request. This can be used for processing the request in the terminating UE on application level and/or for network internal routing purposes.

In accordance with another aspect of the present invention, there is provided a system for establishing an Internet Protocol (IP) multimedia call with decreased Call Setup Time Key Performance Indicator (CST KPI) from an originating user equipment (UE) in a mobile telecommunications network, the system comprising the originating UE being configured: to initiate the IP multimedia call from the originating user equipment (UE) to a terminating UE; to transmit a session initiation protocol (SIP) call initiation message from the originating UE to a terminating Proxy-Call Session Control Function (P-CSCF) through an originating Serving-Call Session Control Function (S-CSCF); to request the creation of a wake-up message via a network element upon receiving the SIP call initiation message; wherein the wake-up message is configured to bypass a plurality of network application servers (ASs), to start switching a transition of the terminating UE from an idle state to a connected state before the SIP call initiation message reaches the terminating P-CSCF.

In accordance with a further aspect of the present invention, there is provided a computer-readable storage medium comprising instructions which, when executed by a computer, cause the computer to carry out the steps of any one of the methods mentioned above.

The present invention has the following advantageous technical effects:

It is cumulative to the above described CST enhancements, i.e. it can be performed in addition to the above described CST optimizations of the prior art.

It parallelizes the IMS and radio resource control procedures. These procedures are currently performed strictly sequentially.

The processing time that is required by the different IMS application servers (ASs) in the originating and terminating leg can be collected for improving the CST.

It works when the UE is in the Radio Resource Control/EPS Connection Management RRC Idle/ECM Idle State which is the case when the UE is not transferring any data, i.e. not having any call or the user is not surfing the web. This is the state that the UE is residing in most of the time.

The drawings described herein are intended to provide further understanding of the present invention. The illustrative examples of the present invention and the description thereof are used to explain the present invention, and they may/must not be understood as constituting improper limitations for the present invention.

Exemplary embodiments of the invention include the parallelization of the transition of the initial SIP call setup request (INVITE request) through the originating_and_terminating IMS network, and the transition of the UE from the RRC_idle/ECM_idle to RRC_connected/ECM_connected state/mode. This invention allows parallelization of these two procedures to a large extent as will be detailed further below.

More details and background information for the RRC_idle and RRC_connected modes are available, for instance at http://know-lte.blogspot.com/2016/06/lte-rrc-states.html.

Usually, the first SIP signaling packet that arrives at the terminating Proxy-Call Session Control Function (P-CSCF) and that is sent onward by the P-CSCF via the Packet Data Network-Gateway (PDN-GW) to the UE on the Gm interface, starts the procedure for activating the radio channel between the network and the UE. If no data (IMS or internet traffic) is being sent, then this channel is suspended for resource usage optimization. That is to say, the procedure on a high level is as illustrated in FIG. 1: Terminating Call Procedures.

It can be seen in FIG. 1 that the Evolved Packet Core/Evolved-UMTS Terrestrial Access Network (EPC/eUTRAN) procedures and the SIP call setup procedures are performed strictly sequentially. The time needed for performing both is thus cumulative when determining the CST.

As further shown in FIG. 1, the INVITE (5a) request that the terminating P-CSCF forwards onward on the Gm interface starts the reestablishment of the radio channel. Thus, a problem with the state of the art is that the INVITE (5b) request can only be sent to the UE when the radio channel has been reestablished.

Figure 2:
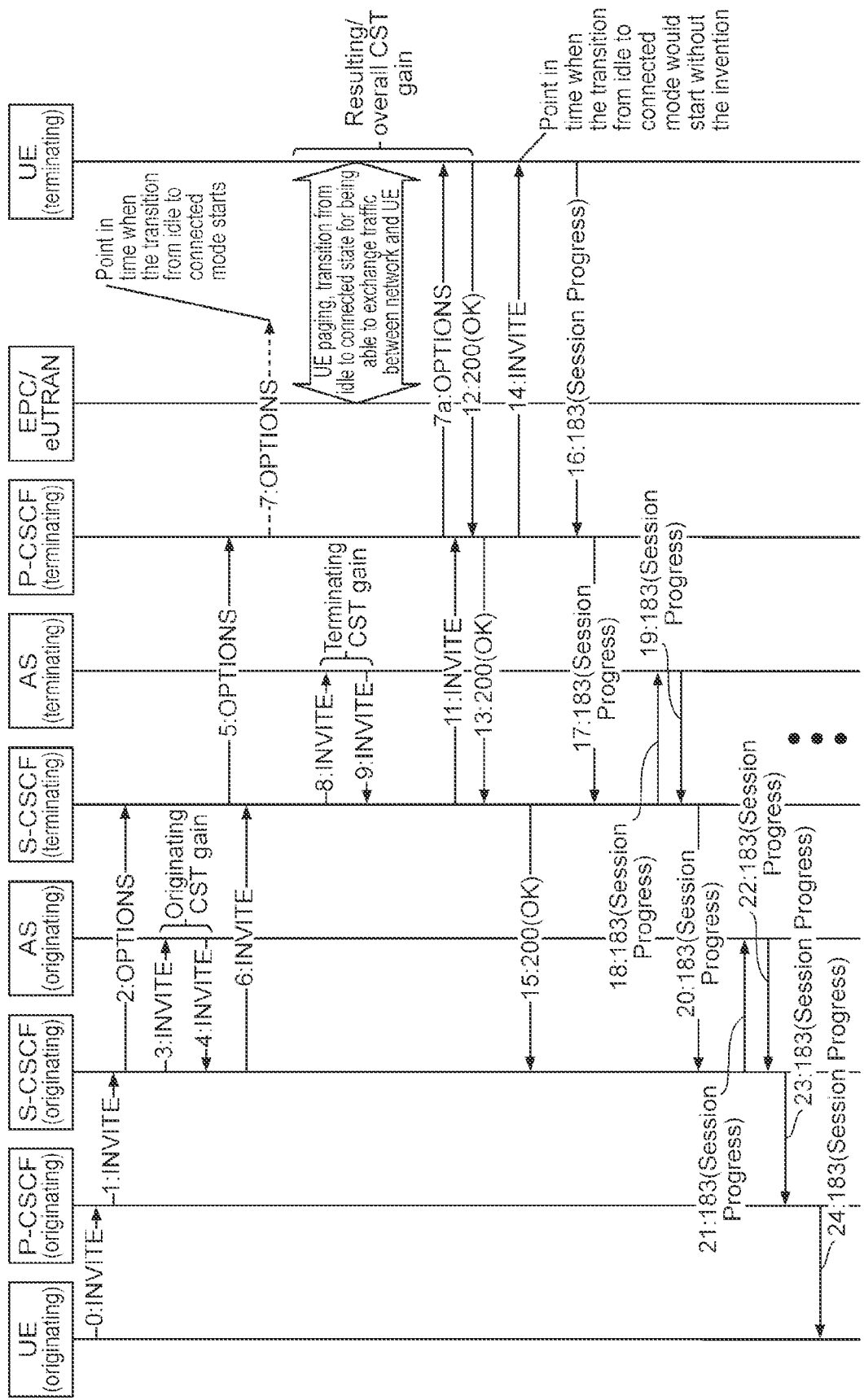
FIG. 2 illustrates Call Procedures of the present invention.
Figure 3:
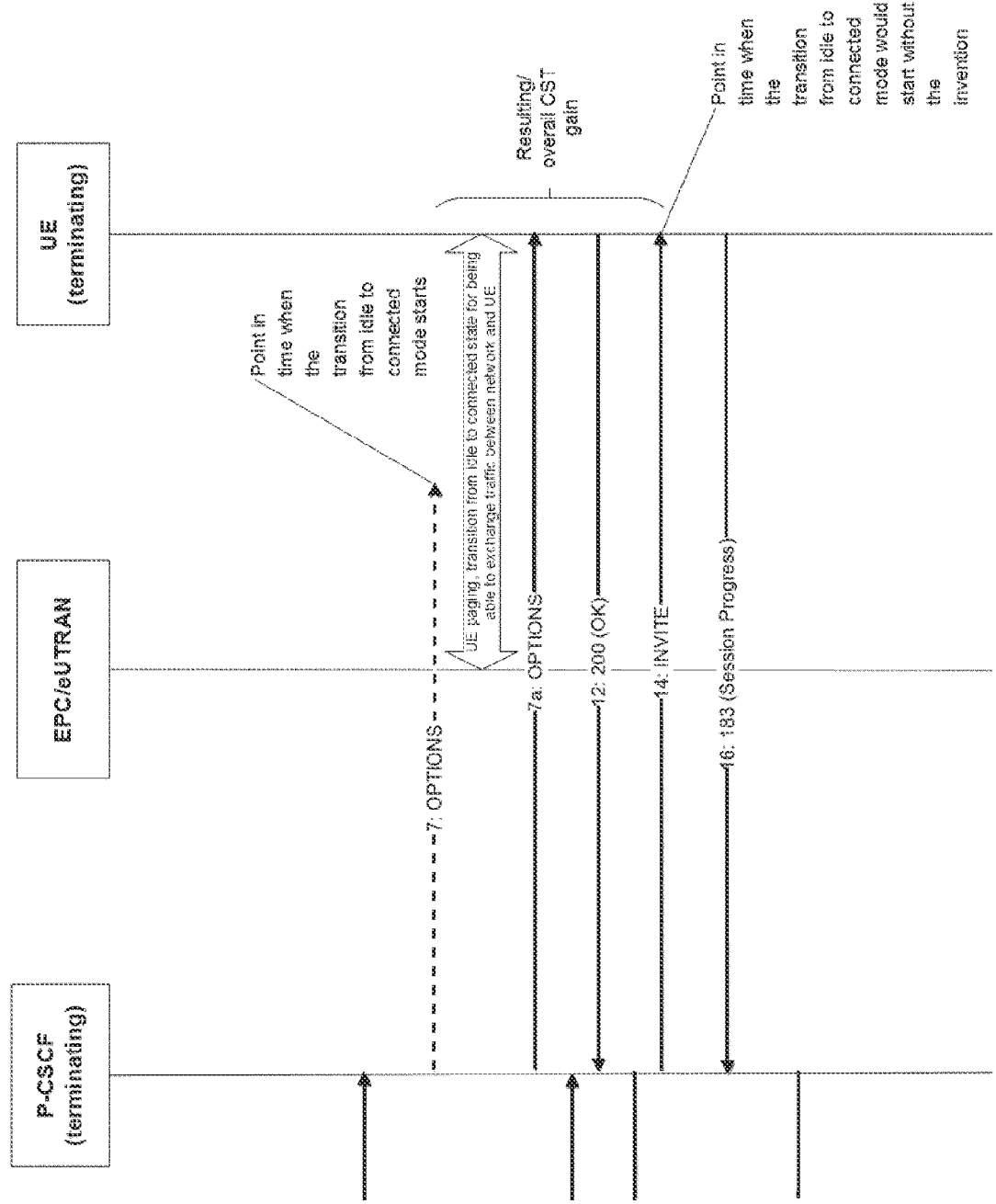
FIG. 3 illustrates a close-up view of the Call Procedures of FIG. 2 at the Terminating Side.

The present invention avoids this by performing both procedures in parallel, as this reduces the CST directly. This is achieved by sending an SIP ping request from the IMS network to the terminating UE. This ping is realized preferably by a wake-up message such as an SIP OPTIONS (message 2) request, and it is created by a network element, such as the originating Serving-Call Session Control Function (S-CSCF), when receiving the initial INVITE request (message 1) for the Voice over Long Term Evolution (VoLTE) call setup, as can be seen in FIG. 2: Invention enriched Call Procedures.

The wake-up message/request may also contain a special media feature tag (see RFC 3840 and RFC 3841) for routing purposes, e.g. like +g.3gpp.wake-up. Such an extension tag in the sense of RFC 3840 would help in avoiding that this request gets routed via IMS application server, and it would make it possible to indicate the wake-up nature of this request e.g. for avoiding informing the end-user about its reception or even advise the terminating UE for responding in a certain way.

This CST improvement thus results in starting the EPC/eUTRAN procedures already with message (7) before the call setup request, which means that the initial INVITE request is forwarded by the terminating P-CSCF finally via the PDN-GW onward, message (14). The CST reduction equals the time the INVITE request needs for transition through the different IMS application servers (ASs), i.e. the time the originating and terminating AS needs for delivering its service (request processing time). Note that there is usually more than one AS in the flow per originating and terminating side. Furthermore, the AS on the originating side usually performs more features/procedures than on the terminating side. This results in the CST reduction being larger on the originating side than on the terminating side. Roughly, the gain on the originating side should be 3 times higher than on the terminating side.

It will be apparent to those skilled in the art that various modifications and variations can be made in the present invention without departing from the scope of the invention. Thus, it is intended that the present invention covers the modifications and variations of this invention provided they come within the scope of the appended claims and their equivalents.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for decreasing a Call Setup Time Key Performance Indicator (CST KPI) of an Internet Protocol (IP) in multimedia call in a mobile telecommunications network, the method comprising:
    initiating the IP multimedia call from an originating user equipment (UE); to a terminating UE;
    transmitting a session initiation protocol (SIP) call initiation message from the originating UE to a terminating Proxy-Call Session Control Function (P-CSCF) through an originating Serving-Call Session Control Function (LS-CSCF); and
    creating a wake-up message via a network element upon receiving the SIP call initiation message;
    wherein the wake-up message bypasses a plurality of network Application application servers (ASs) to start switching a transition of the terminating UE from an idle state to a connected state before the SIP call initiation message reaches the terminating P-CSCF.

2. The method according to claim 1, wherein the wake-up message is preferably an SIP OPTIONS request or an INFO or MESSAGE request.

3. The method according to claim 1, wherein the network element is preferably the originating S-CSCF, or a CST Improvement Application Server, or a SIP back-to-back user agent (B2BUA), or an Interconnection Border Control Function (IBCF).

4. The method according to claim 1, wherein the IP multimedia call includes a Voice over Long Term Evolution (VoLTE) call and/or a Video over Long Term Evolution (VoLTE) call.

5. The method according to claim 1, wherein the idle state corresponds to a Radio Resource Control (RRC)/Evolved Packet System (EPS) Connection Management (ECM) RRC_IDLE/ECM_IDLE state, and the connected state corresponds to a RRC_CONNECTED/ECM_CONNECTED state of the terminating UE.

6. The method according to claim 1, wherein the mobile telecommunications network is an Internet Protocol Multimedia Subsystem (IMS) network.

7. The method according to claim 1, wherein the wake-up message includes a special media feature tag specifying a wake-up purpose of the request.

8. A system for establishing an Internet Protocol (IP) multimedia call with decreased Call Setup Time Key Performance Indicator (CST KPI) from an originating user equipment (UE) in a mobile telecommunications network, the system comprising:
    the originating UE, wherein the originating UE is configured to:
        initiate the IP multimedia call from the originating UE to a terminating UE;
        transmit a session initiation protocol (SIP) call initiation message from the originating UE to a terminating Proxy-Call Session Control Function (P-CSCF) through an originating Serving-Call Session Control Function (S-CSCF); and
        request the creation of a wake-up message via a network element upon receiving the SIP call initiation message;
    wherein the wake-up message is configured to bypass a plurality of network application servers (ASs) to start switching a transition of the terminating UE from an idle state to a connected state before the SIP call initiation message reaches the terminating P-CSCF.

9. The system according to claim 8, wherein the wake-up message is an SIP OPTIONS request or an INFO or MESSAGE request.

10. The system according to claim 8, wherein the network element is preferably the originating S-CSCF, or a CST Improvement Application Server, or a SIP back-to-back user agent (B2BUA) or an Interconnection Border Control Function (IBCF).

11. The system according to claim 8, wherein the IP multimedia call includes a Voice over Long Term Evolution (VoLTE) call or a Video over Long Term Evolution (VoLTE) call.

12. The system according to claim 8, wherein the idle state corresponds to a Radio Resource Control (RRC)/Evolved Packet System (EPS) Connection Management (ECM) RRC_IDLE/ECM_IDLE state and the connected state corresponds to an RRC_CONNECTED/ECM_IDLE state of the terminating UE.

13. The system according to claim 8, wherein the mobile telecommunications network is an Internet Protocol Multimedia Subsystem (IMS) network.

14. The system according to claim 8, wherein the wake-up message includes a special media feature tag specifying a wake-up purpose of the request.

15. A computer-readable storage medium comprising instructions for decreasing a Call Setup Time Key Performance Indicator (CST KPI) of an Internet Protocol (IP) multimedia call in a mobile telecommunications network, wherein the instructions, when executed by a computer, cause the computer to carry out the following steps:
    initiating the IP multimedia call from an originating user equipment (UE) to a terminating UE;
    transmitting a session initiation protocol (SIP) call initiation message from the originating UE to a terminating Proxy-Call Session Control Function (P-CSCF) through an originating Serving-Call Session Control Function (S-CSCF); and creating a wake-up message via a network element upon receiving the SIP call initiation message;

wherein the wake-up message bypasses a plurality of network application servers (ASs) to start switching a transition of the terminating UE from an idle state to a connected state before the SIP call initiation message reaches the terminating P-CSCF.

* * * * *